United States Patent
Yen

(12) United States Patent (10) Patent No.: US 10,382,668 B2
Yen (45) Date of Patent: Aug. 13, 2019

(54) LASER COLLIMATOR MODULE ON A MOBILE DEVICE FOR IMAGE MEASUREMENT

(71) Applicant: CONARY ENTERPRISE CO., LTD., Taipei (TW)

(72) Inventor: Hsien-Cheng Yen, Taipei (TW)

(73) Assignee: Conary Enterprise Co., Ltd., Taipei (TW)

(*) Notice: Subject to any disclaimer, the term of this patent is extended or adjusted under 35 U.S.C. 154(b) by 0 days.

(21) Appl. No.: 15/811,896

(22) Filed: Nov. 14, 2017

(65) Prior Publication Data
US 2019/0149722 A1 May 16, 2019

(51) Int. Cl.
| | |
|---|---|
| G02B 27/30 | (2006.01) |
| G01S 17/89 | (2006.01) |
| G01S 17/08 | (2006.01) |
| G06F 3/048 | (2013.01) |
| H04N 5/232 | (2006.01) |
| G06F 3/0484 | (2013.01) |
| G06F 3/0488 | (2013.01) |

(52) U.S. Cl.
CPC .......... H04N 5/23216 (2013.01); G01S 17/89 (2013.01); G02B 27/30 (2013.01); H04N 5/23293 (2013.01); H04N 5/23296 (2013.01); *G01S 17/08* (2013.01); *G06F 3/0488* (2013.01); *G06F 3/04847* (2013.01)

(58) Field of Classification Search
None
See application file for complete search history.

(56) References Cited

U.S. PATENT DOCUMENTS

| | | | | | |
|---|---|---|---|---|---|
| 9,804,259 | B2 * | 10/2017 | Lin | ...................... | G01S 17/023 |
| 2004/0032650 | A1 * | 2/2004 | Lauer | ................... | G02B 21/004 |
| | | | | | 359/385 |
| 2004/0189941 | A1 * | 9/2004 | Bucourt | ................ | A61B 3/158 |
| | | | | | 351/213 |
| 2007/0146869 | A1 * | 6/2007 | Lauer | ..................... | G02B 5/005 |
| | | | | | 359/368 |
| 2011/0037953 | A1 * | 2/2011 | Nizani | ................... | G02B 3/005 |
| | | | | | 353/38 |
| 2012/0092459 | A1 * | 4/2012 | Tubert | .................... | G06T 7/586 |
| | | | | | 348/46 |
| 2013/0300840 | A1 * | 11/2013 | Borowski | ............ | H04N 13/254 |
| | | | | | 348/50 |
| 2015/0317503 | A1 * | 11/2015 | Powell | .............. | G06K 7/10831 |
| | | | | | 235/455 |
| 2015/0356336 | A1 * | 12/2015 | Hoobler | ................ | G06K 7/089 |
| | | | | | 235/455 |

(Continued)

*Primary Examiner* — Reza Aghevli
(74) *Attorney, Agent, or Firm* — Rosenberg, Klein & Lee

(57) ABSTRACT

A laser collimator module installed on a mobile device for a camera program installed in the mobile device to operate photo-taking. A microprocessor on the mobile device activates a camera unit to record an image with an image data. The image data includes a plurality of pixel values for further retrieving of a set of pixel values horizontally and a pixel value of a dot within the set of pixel values. When the microprocessor matches the set of pixel values with a horizontal distance in the image, the microprocessor renders a point of collimated light projected by the laser collimator module as a reference point for further measurement.

7 Claims, 13 Drawing Sheets

(56) References Cited

U.S. PATENT DOCUMENTS

| | | | |
|---|---|---|---|
| 2016/0104016 A1* | 4/2016 | Deal | G06K 7/0004 |
| | | | 235/462.15 |
| 2016/0104017 A1* | 4/2016 | Deal | G06K 7/0004 |
| | | | 235/462.07 |
| 2016/0180128 A1* | 6/2016 | Utykanski | G06K 7/10564 |
| | | | 235/462.42 |
| 2016/0180129 A1* | 6/2016 | Utykanski | G06K 7/10722 |
| | | | 235/462.42 |
| 2016/0188932 A1* | 6/2016 | Powell | G06K 7/10564 |
| | | | 235/462.42 |
| 2016/0188933 A1* | 6/2016 | Powell | G06K 7/10564 |
| | | | 235/462.42 |
| 2016/0188934 A1* | 6/2016 | Powell | G06K 7/10564 |
| | | | 235/462.42 |
| 2016/0321483 A1* | 11/2016 | Utykanski | G06K 7/0004 |
| 2016/0321485 A1* | 11/2016 | Utykanski | G06K 7/10811 |
| 2017/0004340 A1* | 1/2017 | Powell | G06K 7/0004 |
| 2017/0138732 A1* | 5/2017 | Pettersson | B64C 39/024 |
| 2017/0286732 A1* | 10/2017 | Lei | G06K 7/10732 |
| 2018/0082095 A1* | 3/2018 | Powell | G06K 7/10564 |

* cited by examiner

LASER COLLIMATOR MODULE ON A MOBILE DEVICE FOR IMAGE MEASUREMENT

BACKGROUND OF THE INVENTION

1. Field of the Invention

The present invention relates to a camera program installed in and operated by a mobile device with a laser collimator module installed on the mobile device for measurement.

2. Description of the Related Art

Measurements are important in many different industries such as architecture, interior decoration, and product manufacturing. Traditionally engineers' tapes are commonly used for measurements; then there is laser rangefinders widely applied for more convenient measurements. However, both tools can only perform measurements on scenes and the results have to be manually recorded, thereby leaving some room for improvement.

SUMMARY OF THE INVENTION

A primary objective of the present invention is to provide a mobile device with a laser collimator module for a camera program installed therein to perform photo taking and instant image measurement right on a touch screen instead of performing manual measurement methods.

To achieve the objects mentioned above, the present invention comprises a mobile device including a housing, a motherboard installed in the housing, a microprocessor installed on the motherboard, a memory unit installed on the motherboard and electrically connected to the microprocessor, a camera unit installed on a rear surface of the housing and electrically connected to the microprocessor to retrieve an image at a pre-determined angle with a horizontal distance shown on said image, and a touch screen installed on a front surface of the housing and electrically connected to the microprocessor to display the image; a laser collimator module coupled to the mobile device and operated by the microprocessor, said laser collimator module arranged at a pre-determined distance from the camera unit and projecting a collimated light parallel with an optic axis retrieved by the camera unit, said optic axis and collimated light respectively adjusted perpendicular to said horizontal distance on the image for an end of said optic axis and a point of the collimated light projected to said horizontal distance; and a camera program installed in the memory unit and operated by the microprocessor to activate the camera unit, record the image and thereby retrieve an image data, said image data including pixel values for further retrieving of a set of pixel values horizontally and a pixel value of a dot within the set of pixel value; whereby the microprocessor matches the set of pixel values with the horizontal distance and sets the point of the collimated light as the dot in the image, rendering a reference point for measurement with the pixel value of the dot.

Furthermore, the point of the collimated light rendered as the reference point is located within an angle half of the pre-determined angle set for image taking of the camera program and within half of the set of the pixel values, said angle half of a pre-determined angle rendered as a first parameter and a distance from the reference point to the optic axis rendered as a second parameter so that a distance between the laser collimator module and the reference point is calculated by the first and second parameters with functions of tangent and cotangent in the trigonometric functions.

The laser collimator module is installed on the motherboard in the housing of the mobile device and the housing further includes an opening hole at the rear surface of the housing corresponding to the laser collimator module for projection of the collimated light. The laser collimator module preferably includes a printed circuit board with a plurality of connecting elements electrically connected to the microprocessor, a light emitting module disposed at a side of the printed circuit board, a driving circuit disposed between and coupled to the printed circuit board and the light emitting module, and a case body covering the printed circuit board and the light emitting module and exposing the connecting elements of the printed circuit board, said case body further including a light emitting hole on a surface thereof for projection from the light emitting module. In another embodiment, a metal piece is adhered on the rear surface of the housing for attachment with a magnet arranged on the laser collimator module to dispose the laser collimator module on the housing of the mobile device.

The housing may include a first wireless transmitter disposed therein and electrically connected to the microprocessor, and the laser collimator module includes a printed circuit board with a connecting element as a second wireless transmitter electrically connected to the first wireless transmitter, a light emitting module disposed at a side of the printed circuit board, a driving circuit disposed between and coupled to the printed circuit board and the light emitting module, and a case body covering the printed circuit board, the light emitting module and the connecting elements of the printed circuit board, said case body further including a light emitting hole on a surface thereof for projection from the light emitting module. In another embodiment, a connecting port is disposed at a side of the housing and electrically connected to the microprocessor, and the laser collimator module includes a printed circuit board with a connecting plug as a connecting element electrically connected to the connecting port of the mobile device, a light emitting module disposed at a side of the housing, a driving circuit disposed between and coupled to the printed circuit board and the light emitting module, and a case body covering the printed circuit board and the light emitting board and leaving the connecting element connectable from outside the case body, said case body further including a light emitting hole on a surface thereof for projection from the light emitting module.

Moreover, the light emitting module may include a laser diode disposed in the case body with a plurality of pins arranged at a bottom of the laser diode and a collimating lens disposed in the case body in front of the laser diode. The light emitting module can be installed on an upper surface of the printed circuit board; the light emitting hole is arranged in an L shape and a reflector is disposed at a right-angle of the L shape and inclined at 45° for reflection of a light emitting from the light emitting module to a pre-determined direction.

The camera program further has a zooming frame on the image for focusing on the point of the collimated light by finger touching and for setting the pixel value of the point as the pixel value of the dot, thereby a circle for recognition is circling around the dot and a secondary window is displayed on the touch screen with a cross mark to display an enlarged view of the dot for further recognition of a center of the dot by finger touching. The microprocessor displays a line with measurement data near the dot as the reference point on the touch screen according to the pixel value of the dot after calculation and both ends of the line are extendable by finger touching on the touch screen for further measurement. In another embodiment, the microprocessor displays an area with measurement data near the dot as the reference point on the touch screen according to the pixel value of the dot after calculation and the area includes at least three ends that are extendable by finger touching on the touch screen for further measurement.

With structures disclosed above, the present invention is able to perform instant measurement with the laser collimator module on a mobile device after taking a photo without going through complicated preparations for measurement tools to be ready for operation.

DETAILED DESCRIPTION OF THE PREFERRED EMBODIMENT

Figure 1:
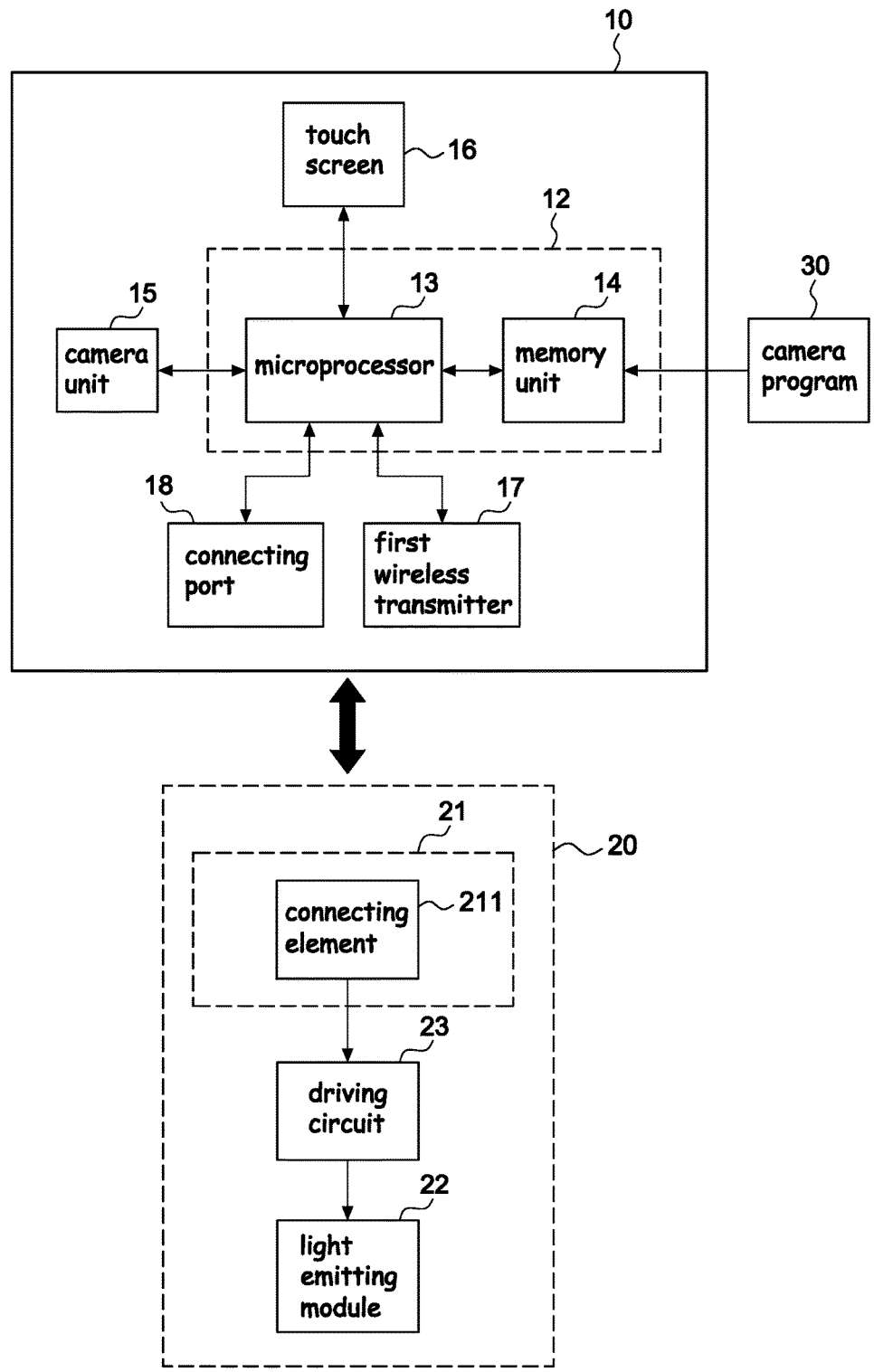
FIG. 1 is a block diagram illustrating a circuit connection of the present invention.
Figure 2:
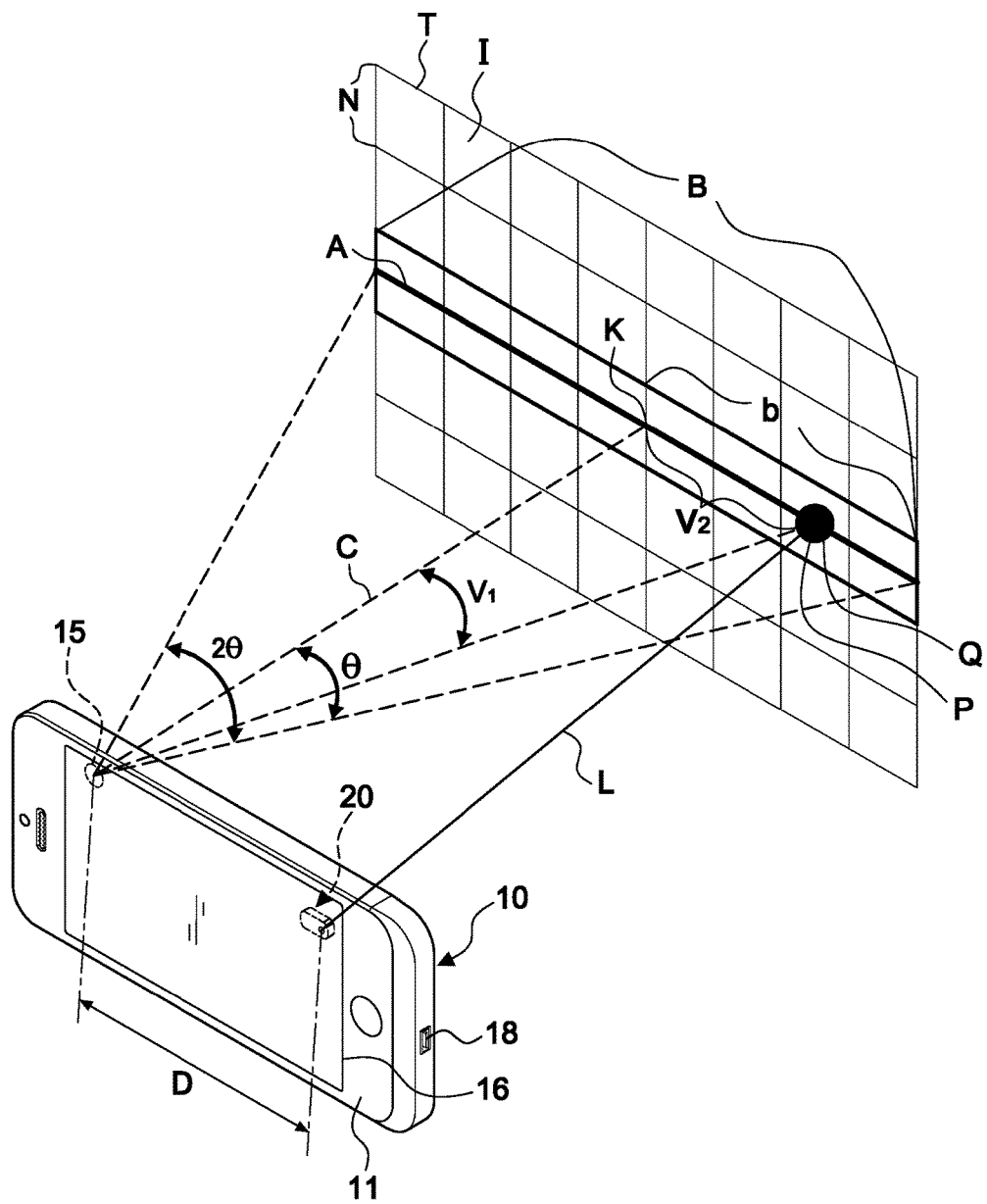
FIG. 2 is a schematic diagram illustrating measurement of an image according to the present invention.
Figure 3A:
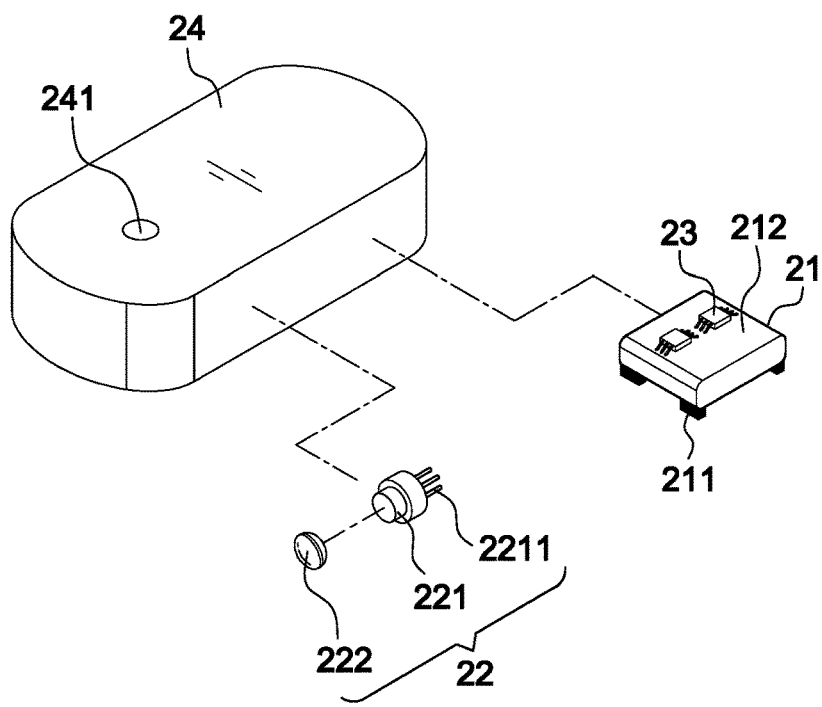
FIG. 3A is an exploded view of a laser collimator module of the present invention.
Figure 3B:
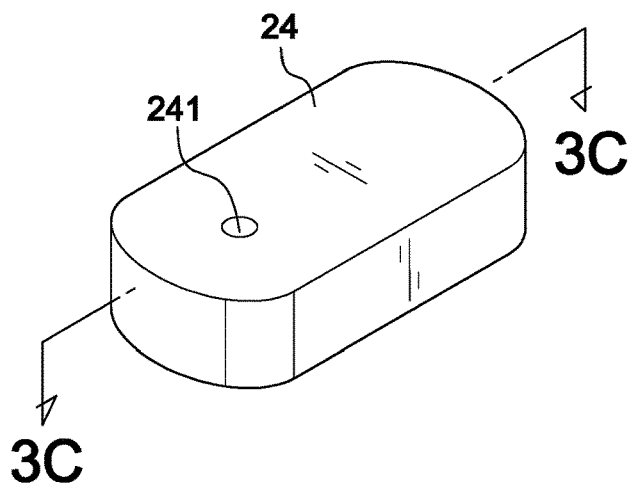
FIG. 3B is a perspective view of the laser collimator module of the present invention.
Figure 3C:
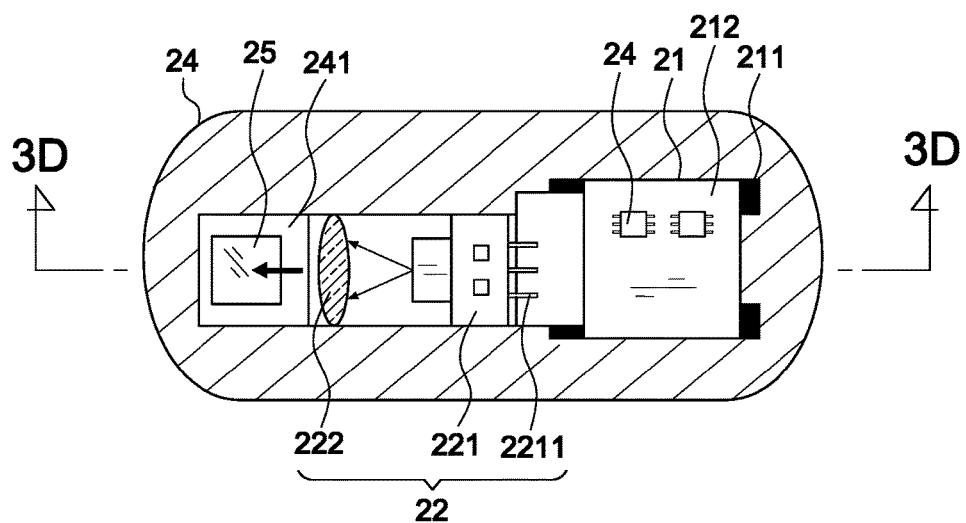
FIG. 3C is a sectional view along line 3C-3C of FIG. 3B.
Figure 3D:
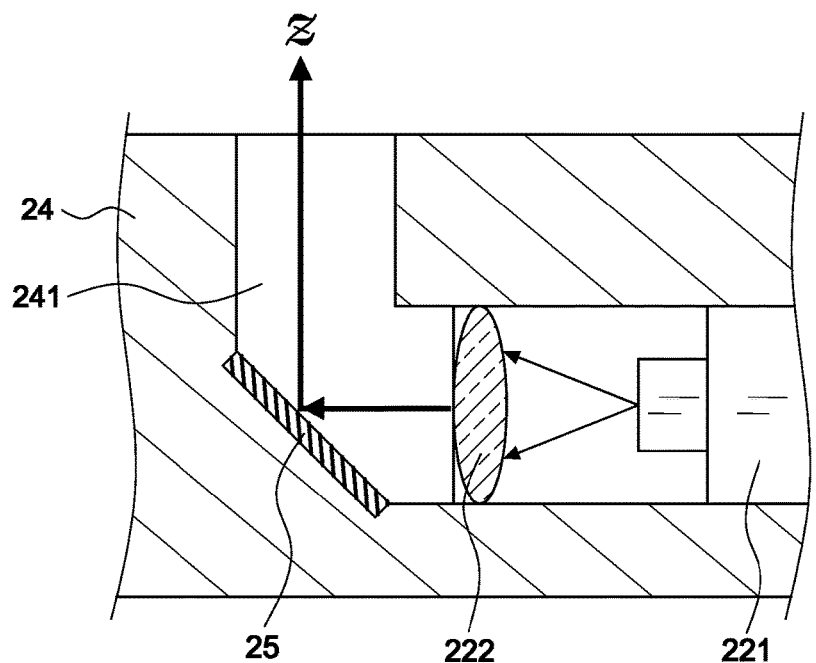
FIG. 3D is a sectional view along line 3D-3D of FIG. 3C.

Referring to FIGS. 1-9B, a preferred embodiment of the present invention mainly comprises a mobile device 10, a laser collimator module 20 and a camera program 30.

The mobile device 10 includes a housing 11, a motherboard 12 installed in the housing 11, a microprocessor 13 installed on the motherboard 12, a memory unit 14 installed on the motherboard 12 and electrically connected to the microprocessor 13, a camera unit 15 installed on a rear surface of the housing 11 and electrically connected to the microprocessor 13 to retrieve an image T at a pre-determined angle 20 with a horizontal distance A shown on the image T, and a touch screen 16 installed on a front surface of the housing 11 and electrically connected to the microprocessor 13 to display the image T.

The laser collimator module 20 is coupled to the mobile device 10 and operated by the microprocessor 13. The laser collimator module 20 is arranged at a pre-determined distance D from the camera unit 15 and projects a collimated light L parallel with an optic axis C retrieved by the camera unit 15. The optic axis C and collimated light L are respectively adjusted perpendicular to the horizontal distance A on the image T for an end of the optic axis C and a point P of the collimated light L projected to the horizontal distance A.

The camera program 30 is installed and stored in the memory unit 14 and operated by the microprocessor 13 to activate the camera unit 15, record the image T and thereby retrieve an image data I. The image data I includes pixel values N for further retrieving of a set of pixel values B horizontally and a pixel value Q of a dot within the set of pixel value B; whereby the microprocessor 13 matches the set of pixel values B with the horizontal distance A and sets the point P of the collimated light L as the dot in the image T, rendering a reference point for measurement with the pixel value Q of the dot.

In this embodiment, the point P of the collimated light L rendered as the reference point is located within an angle θ half of a pre-determined angle 20 set for image taking of the camera program 30 and within pixel values b half of the set of the pixel values B. Thereby the angle θ is rendered as a first parameter $V_1$ and a distance from the reference point to the optic axis C is rendered as a second parameter $V_2$. Both the optic axis C and the collimated light L are perpendicular to the set of pixel values B; therefore, the distance between the optic axis C and the point P of the collimated light L equals to the distance between the collimated light L and an end K of the optic axis C on the set of pixel values B, and the angle from the optic axis C to the point P equals to the angle from the collimated light L to the end K of the optic axis C on the set of pixel values B. Then the microprocessor 13 of the mobile device 10 is able to calculate a distance between the laser collimator module 20 and the reference point with the first and second parameters $V_1$, $V_2$ applied to functions of tangent and cotangent in the trigonometric functions.

In another embodiment, the collimated light L projected from the laser collimator module 20 is reflected back and received by the laser collimator module 20 after forming the point P on the image T. The time period between projecting the collimated light L and receiving the reflected collimated light L enables the microprocessor 13 to calculate a distance between the laser collimator module 20 and the point P of the collimated light L. After taking and recording the image, the microprocessor 13 is able to render the point P of the collimated light L as the reference point.

Further referring to FIGS. 3A-3D, the laser collimator module 20 includes a printed circuit board 21 with a plurality of connecting elements 211, a light emitting module 22 disposed at a side of the printed circuit board 21, a driving circuit 23 disposed between and coupled to the printed circuit board 21 and the light emitting module 22, and a case body 24 covering the printed circuit board 21 and the light emitting module 22. The case body 24 further includes a light emitting hole 241 on a surface thereof for projection from the light emitting module 22; the light emitting hole 241 is arranged in an L shape and a reflector 25 is disposed at a right-angle of the L shape and inclined at 45° for reflection of the collimated light L emitted from the light emitting module 22 to a pre-determined Z-axis direction. In this embodiment, the light emitting module 20 includes a laser diode 221 disposed in the case body 24 with a plurality of pins 2221 arranged at a bottom of the laser diode 221 and a collimating lens 222 disposed in the case body 24 in front of the laser diode 221. The case body 24 may further include a hollow tube (not shown) in the case body 24 for disposing the laser diode 221 and the collimating lens 222 therein.

Figure 4A:
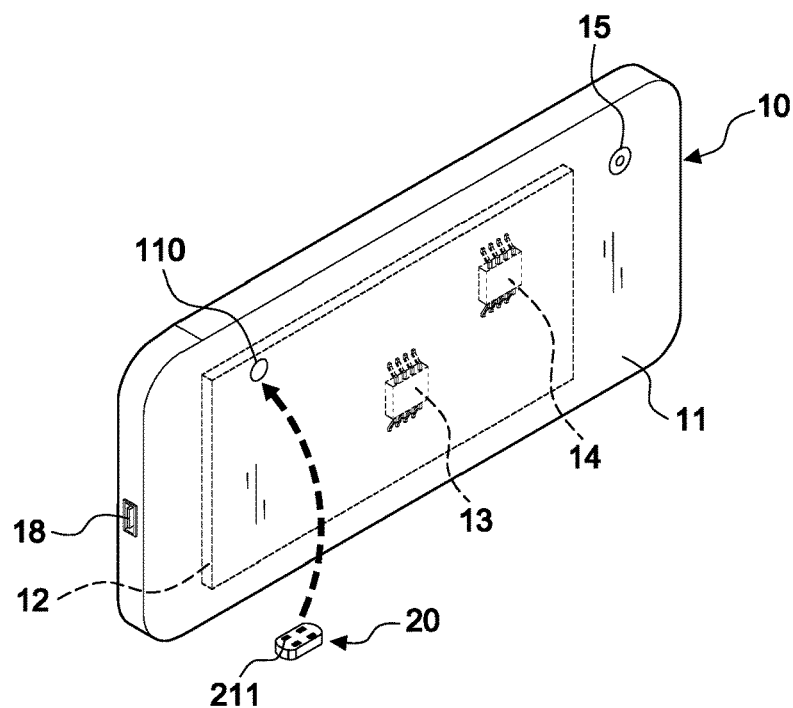
FIG. 4A is an exploded view displaying the laser collimator module and a mobile device according to the preset invention.
Figure 4B:
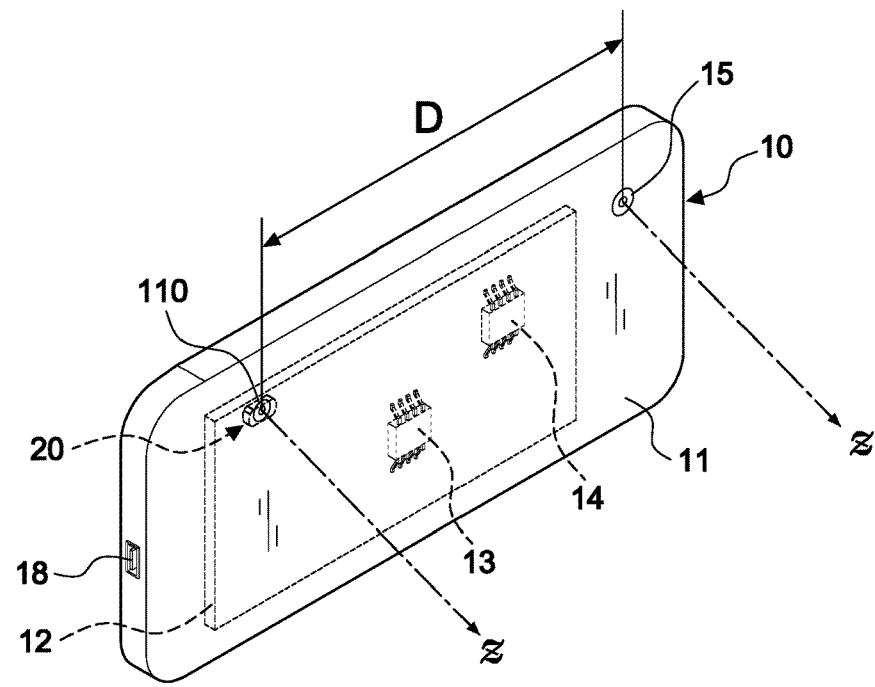
FIG. 4B is a perspective view of the laser collimator module installed in the mobile device according to the present invention.

As shown in FIGS. 4A and 4B, the laser collimator module 20 is installed on the motherboard 12 in the housing 11 and the plurality of connecting elements 211 of the laser collimator module 20 are exposed outside the housing 24 for electrical connection to the microprocessor 13 for power supply and signal transmission. The housing 11 further includes an opening hole 110 at the rear surface of the housing 11 corresponding to the laser collimator module 20 for projection of the collimated light L in a Z-axis direction, same as the direction in which the camera unit 15 taking photos.

Figure 5A:
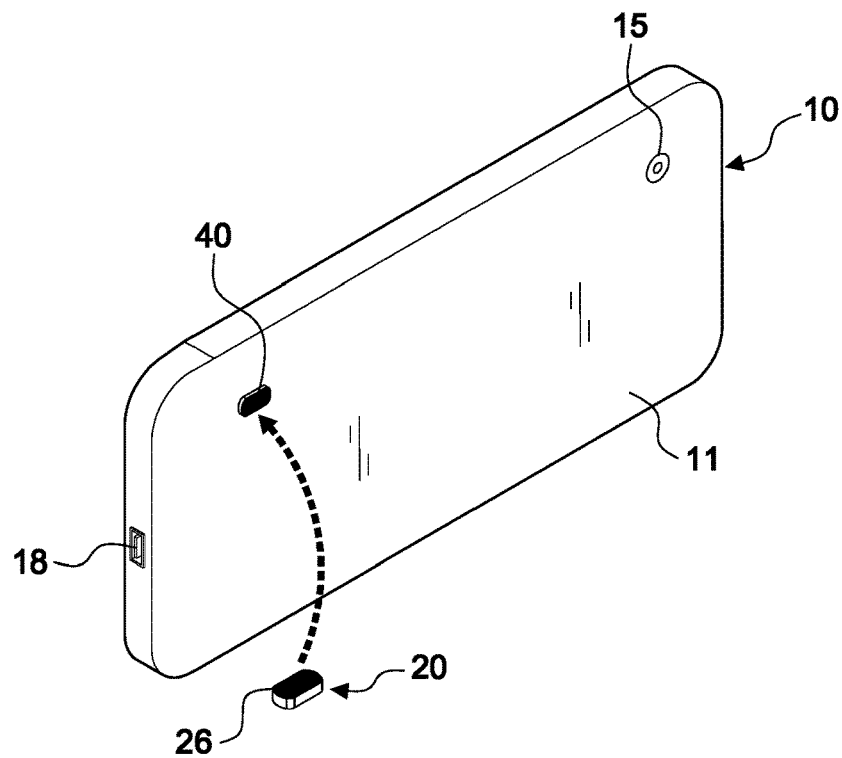
FIG. 5A is another exploded view displaying the laser collimator module and the mobile device according to the preset invention.
Figure 5B:
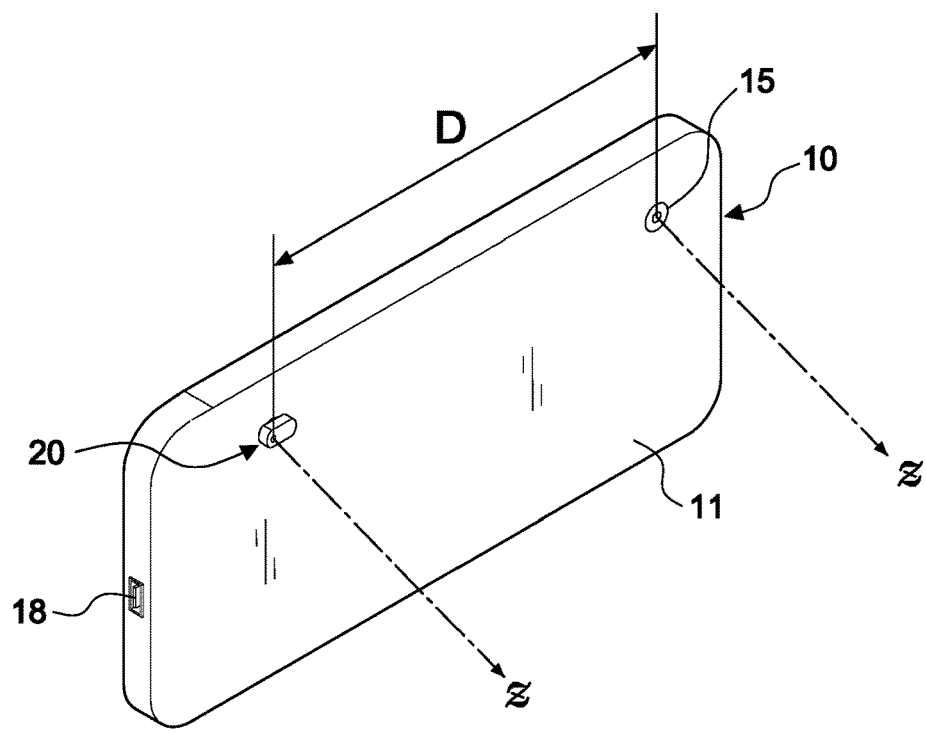
FIG. 5B is another perspective view of the laser collimator module installed in the mobile device according to the present invention.
Figure 6A:
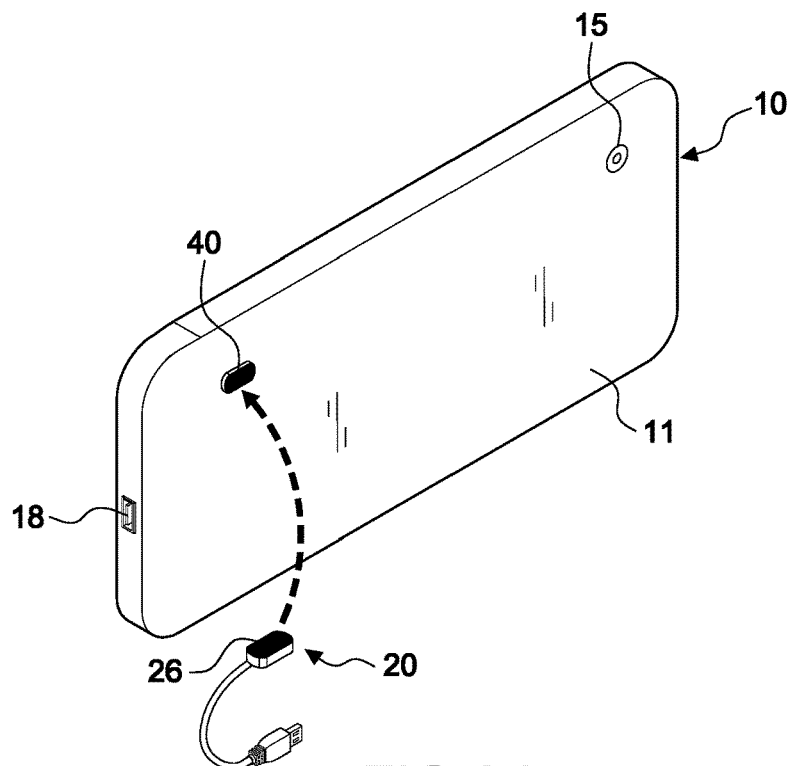
FIG. 6A is another exploded view displaying the laser collimator module and the mobile device according to the preset invention.
Figure 6B:
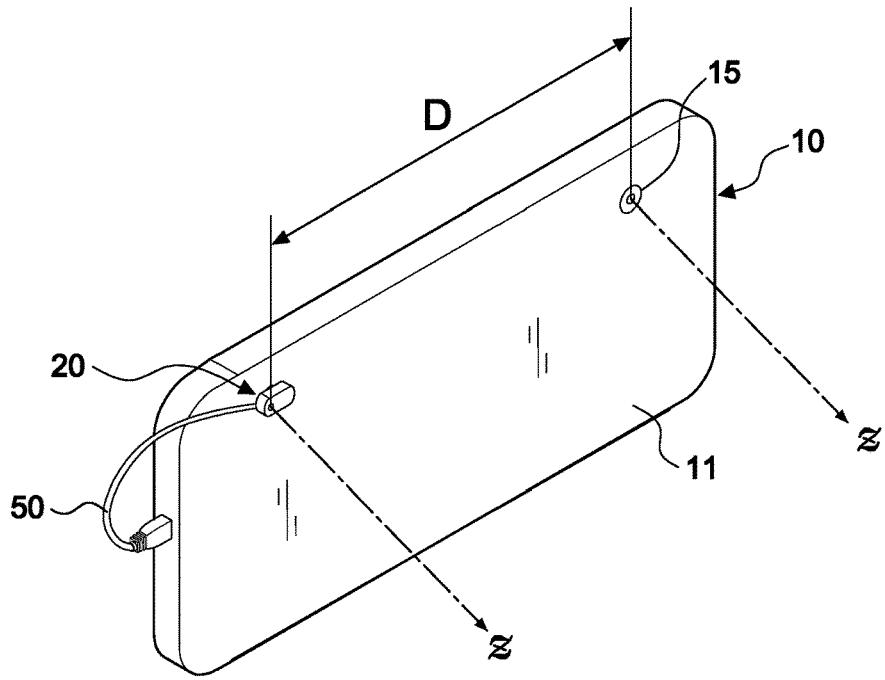
FIG. 6B is another perspective view of the laser collimator module installed in the mobile device according to the present invention.
Figure 7A:
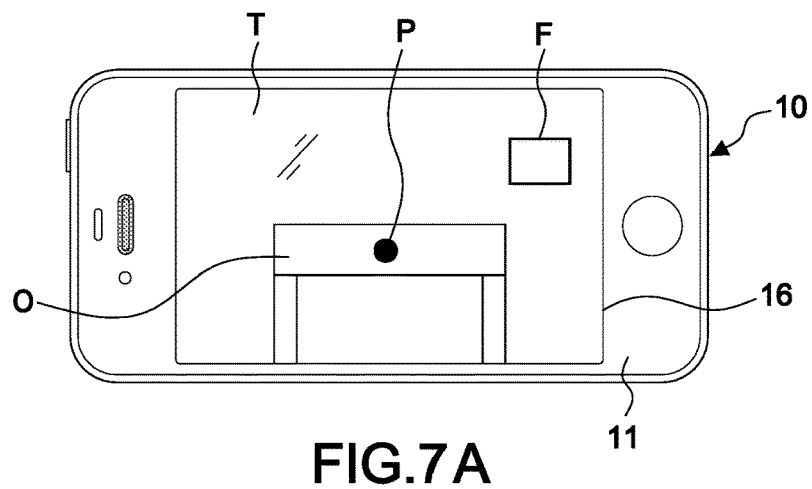
FIG. 7A is a schematic diagram displaying a zooming frame on an image taken by the mobile device according to the present invention.
Figure 7B:
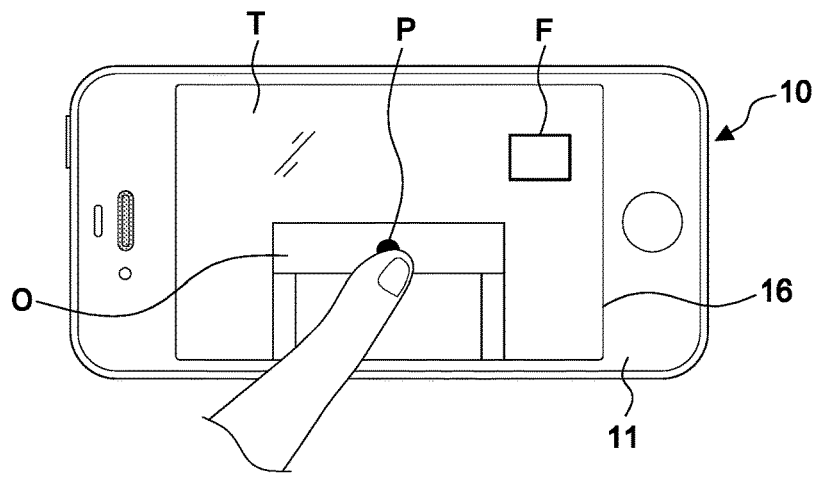
FIG. 7B is a schematic diagram illustrating a point of a collimated light set by finger touching according to the present invention.
Figure 7C:
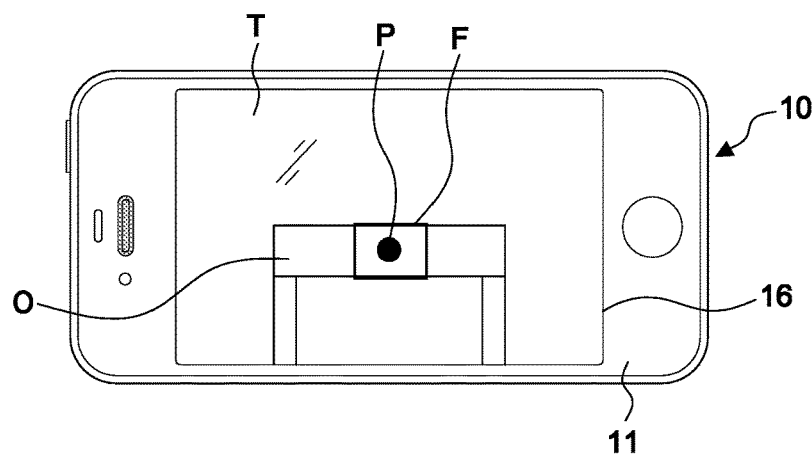
FIG. 7C is a schematic diagram illustrating the zooming frame focusing on the point of the collimated light according to the present invention.
Figure 7D:
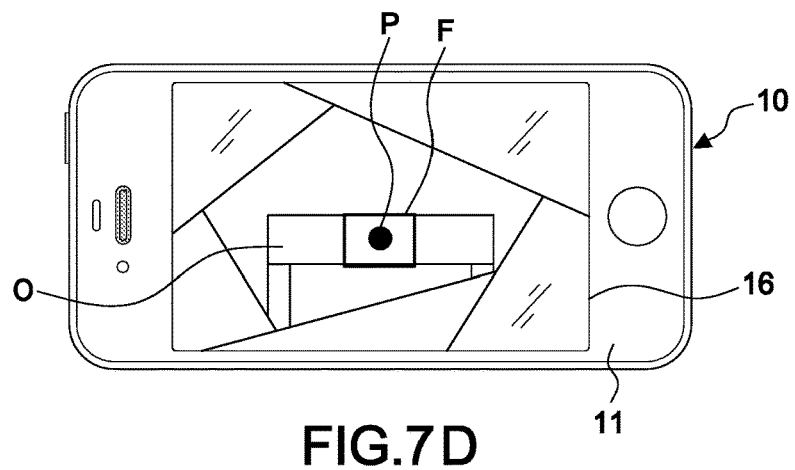
FIG. 7D is a schematic diagram illustrating a camera program taking an image according to the present invention.
Figure 7E:
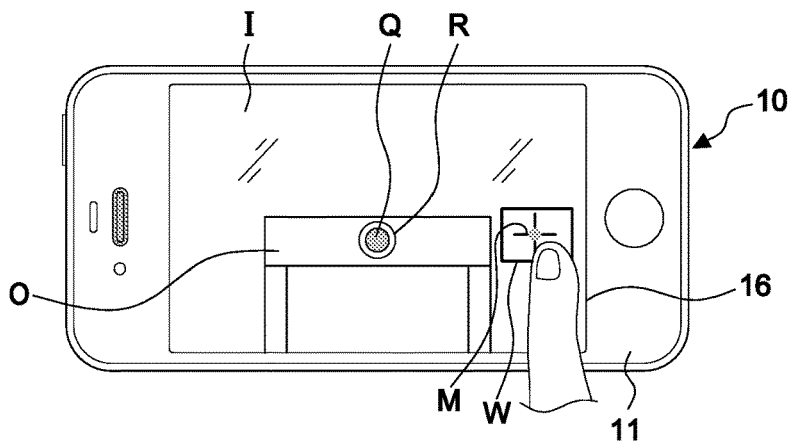
FIG. 7E is a schematic diagram illustrating the camera program locating a center of a pixel value of a dot in the image according to the present invention.
Figure 7F:
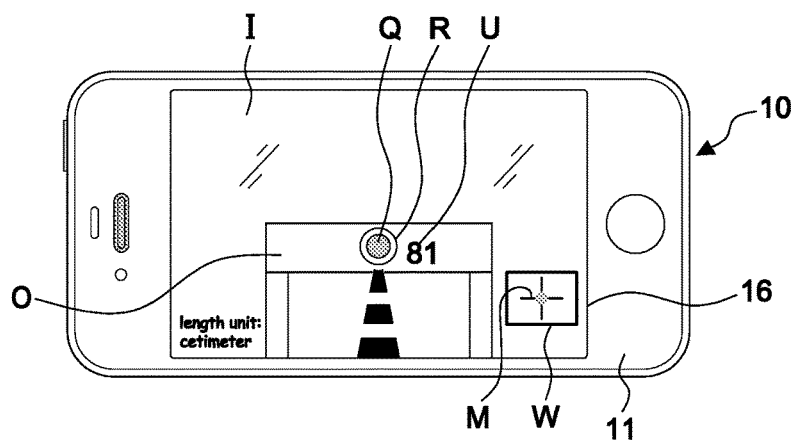
FIG. 7F is a schematic diagram illustrating measurement data displayed on a touch screen of the mobile device.
Figure 8A:
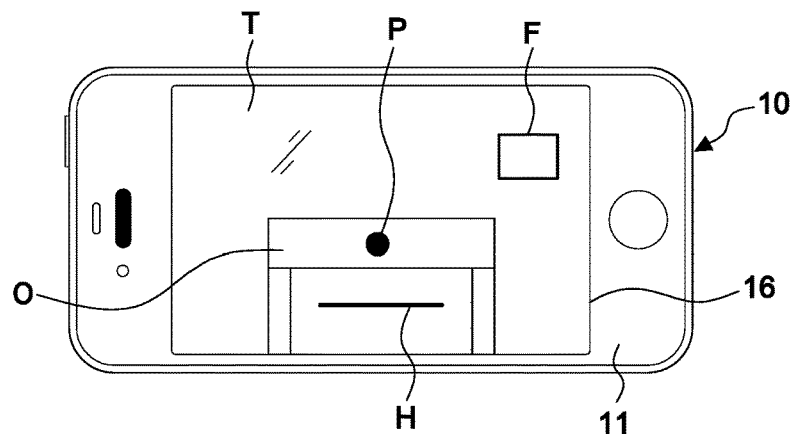
FIG. 8A is a schematic diagram displaying the zooming frame and a baseline on an image taken by the mobile device.
Figure 8B:
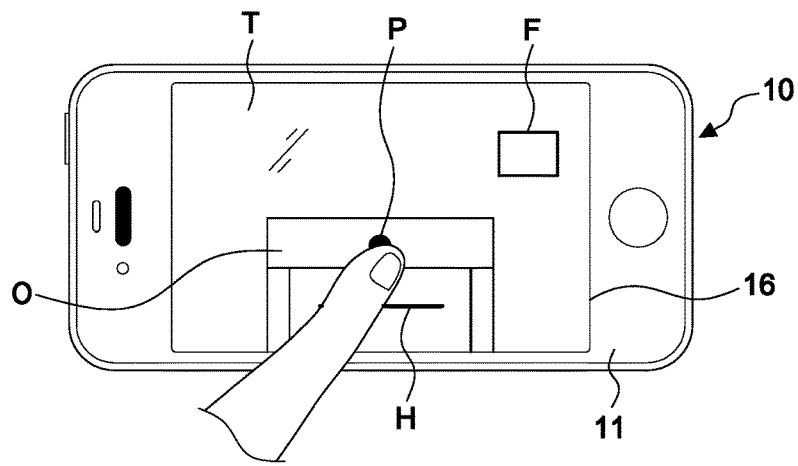
FIG. 8B is another schematic diagram illustrating the point of the collimated light set by finger touching.
Figure 8C:
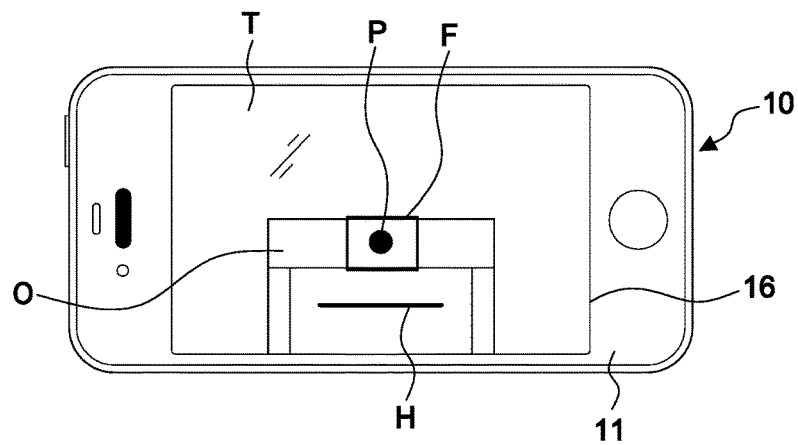
FIG. 8C is another schematic diagram illustrating the zooming frame focusing on the point of the collimated light.
Figure 8D:
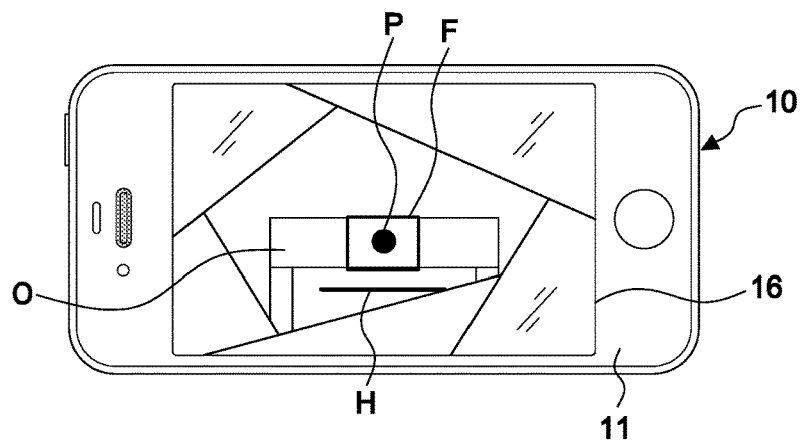
FIG. 8D is another schematic diagram illustrating the camera program taking an image.
Figure 8E:
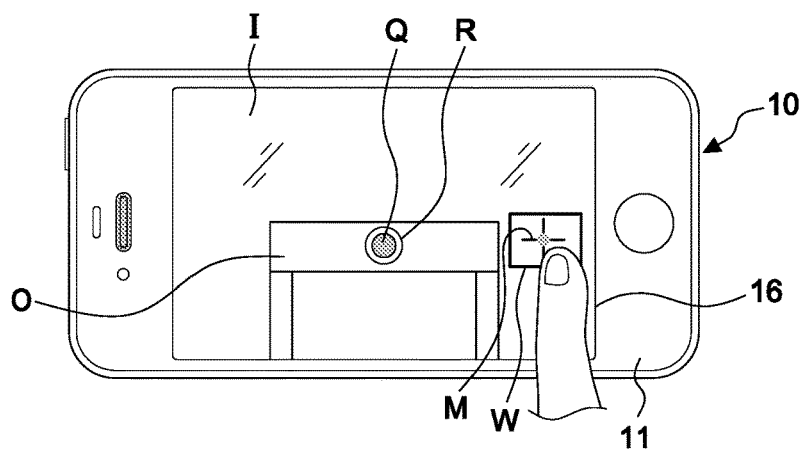
FIG. 8E is another schematic diagram illustrating the camera program locating a center of a pixel value of a dot in the image according to the present invention.
Figure 8F:
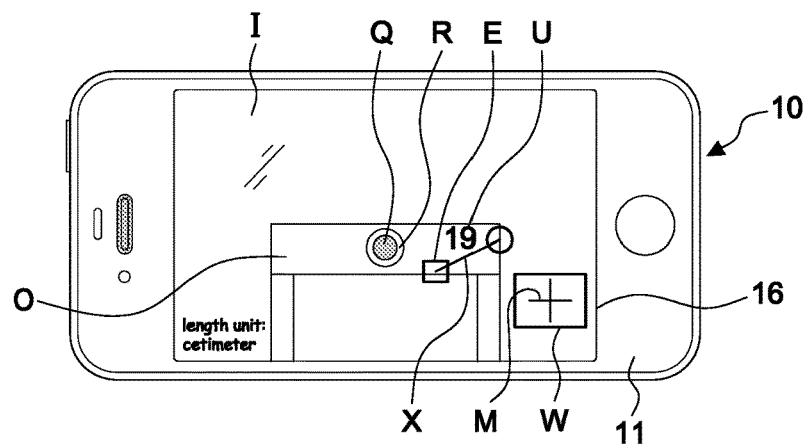
FIG. 8F is a schematic diagram illustrating a extendable line displayed on the touch screen for measurement.
Figure 8G:
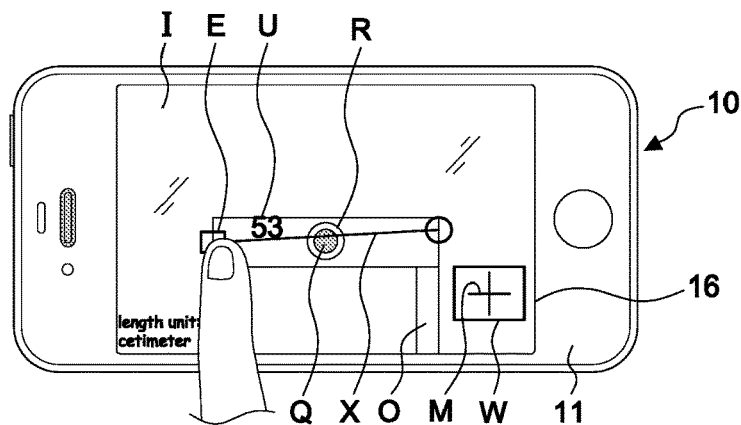
FIG. 8G is a schematic diagram illustrating an end of the extendable line adjusted by finger touching.
Figure 8H:
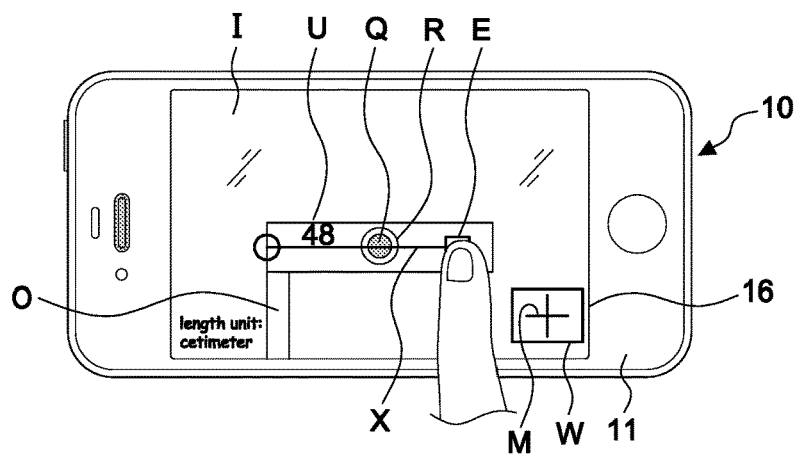
FIG. 8H is a schematic diagram illustrating another end of the extendable line adjusted by finger touching.
Figure 8I:
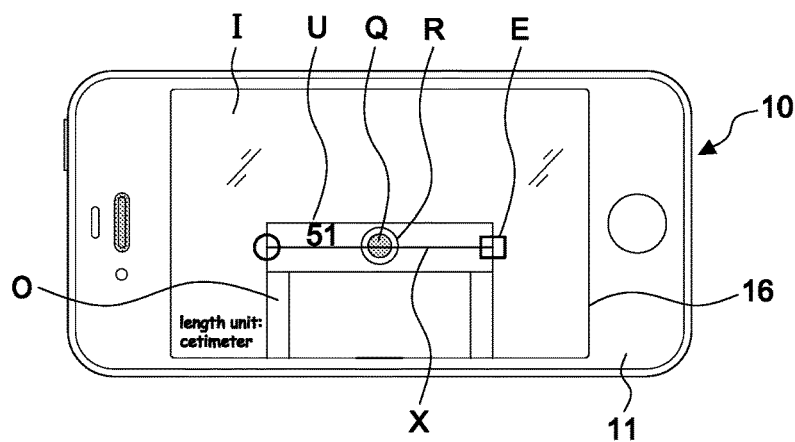
FIG. 8I is a schematic diagram illustrating the extendable line after being adjusted.

With reference to FIGS. 5A-6B, the present invention further comprises a metal piece 40 adhered on the rear surface of the housing 11 for attachment with a magnet 26 arranged on the laser collimator module 20 to dispose the laser collimator module 20 on the housing 11 of the mobile device 10, so that the direction of projection from the laser collimator module 20 and the direction of photo taking of the camera unit 15 are the same. In another embodiment, the housing 11 further includes a first wireless transmitter 17 disposed therein and electrically connected to the microprocessor 13 and the laser collimator module 20 includes a connecting element 211 as a second wireless transmitter covered inside the case body 24 as shown in FIGS. 1, 5A and 5B. The second wireless transmitter 211 is electrically connected to the first wireless transmitter 17 for receiving signals and receives power supply from a battery (not shown) of the mobile device 10. In another embodiment, a connecting port 18 is further disposed at a side of the housing 11 and electrically connected to the microprocessor 13, and the connecting element 211 is a connecting plug electrically connected to the connecting port 18 of the mobile device 10 via a transmission cable 50. The connecting plug 211 is covered by the case body 24 but connectable from outside the case body 24 for retrieving power and signals as shown in FIGS. 1, 6A and 6B.

As illustrated in FIGS. 7A-7F, the camera program 30 further has a zooming frame F on the image T for focusing on the point P of the collimated light L by finger touching and for setting the pixel value of the point P as the pixel value Q of the dot, thereby a circle R for recognition is circling around the dot and a secondary window W is displayed on the touch screen 16 with a cross mark M to display an enlarged view of the dot for further recognition of a center of the dot by finger touching. In this embodiment, a measurement data U of an object O shown 81 cm, which is the distance from the laser collimator module 20 to the object O.

Figure 9A:
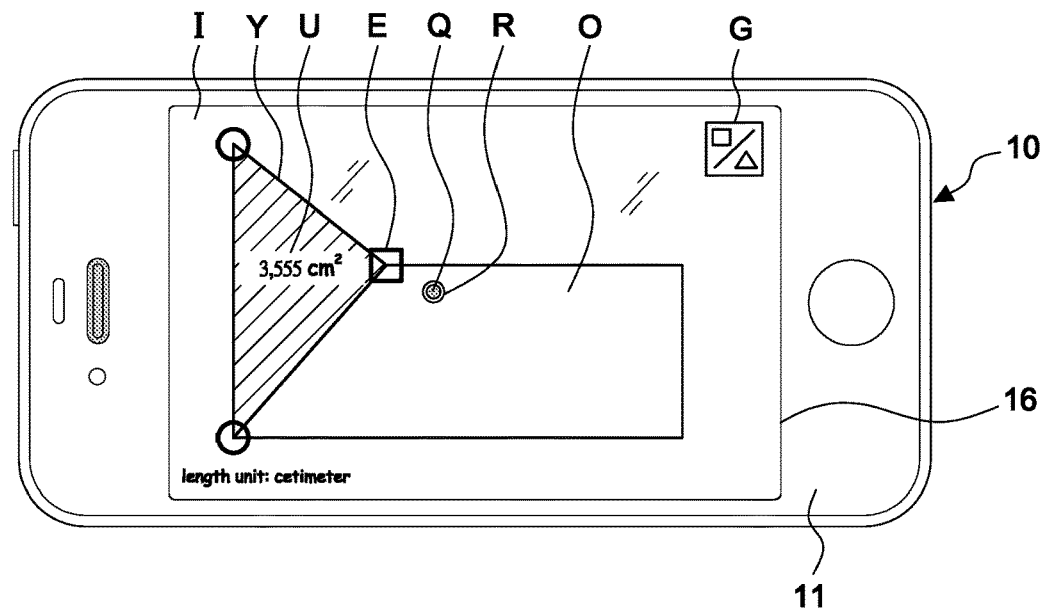
FIG. 9A is a schematic diagram illustrating an area after being adjusted according to the present invention.
Figure 9B:
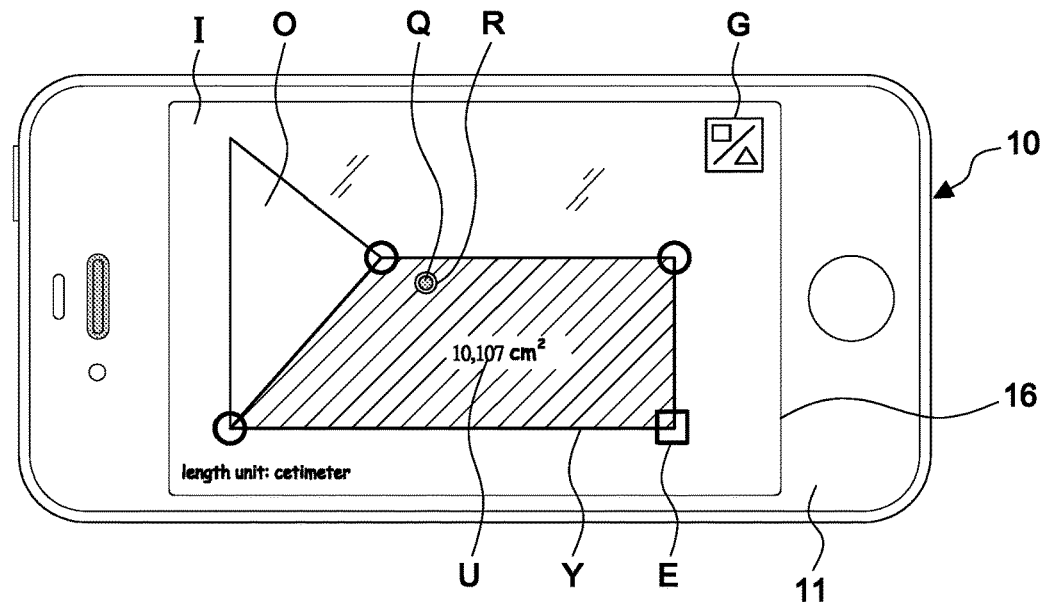
FIG. 9B is a schematic diagram illustrating another area after being adjusted according to the present invention.

As illustrated in FIGS. 8A-8I, the camera program 30 further has a zooming frame F and a horizontal baseline H on the image T and the zooming frame F is focusing on the point P of the collimated light L by finger touching for setting the pixel value of the point P as the pixel value Q of the dot, thereby a circle R for recognition is circling around the dot and a secondary window W is displayed on the touch screen 16 with a cross mark M to display an enlarged view of the dot for further recognition of a center of the dot by finger touching. Then a measurement data U of a distance from the laser collimator module 20 to the object O is saved by the memory unit 14 and can be displayed on the touch screen 16 with the image T thereon and a line X with the measurement data U is displayed near the dot as the reference point on the touch screen 16 according to the pixel value Q of the dot after calculation; both ends E of the line X are extendable by finger touching on the touch screen 16 for further measurement and the line X can be horizontal, vertical, of diagonal. In this embodiment, the measurement data U is 51 cm. Or the microprocessor 13 displays an area Y with a measurement data U near the dot as the reference point on the touch screen 16 according to the pixel value Q of the dot after calculation, and the area Y includes at least three ends E that are extendable by finger touching on the touch screen 16 for further measurement. In FIGS. 9A and 9B, an area selecting button G is shown on the image T and an area Y on the image T can be adjusted by finger touching operation of the area selecting button G. A triangular area Y in FIG. 9A has a measurement data U of 355 cm$^2$ and a square area Y in FIG. 9B has a measurement data of 10107 cm$^2$; or both of the triangular and square areas Y can be combined for further measurement, whereby each end E of the line X or each corner E of the areas Y can be further extended and adjusted with the secondary window W for a more precise measurement setting of the object O. When the ends or corners E are fixed for setting, a small circle is shown around them; when they can be further adjusted or extended, a small square is shown around them.

With the structure disclosed above, the laser collimator module 20 is installed on the mobile device 10 internally or externally for precisely fixing an original point and for stably projecting the collimated light L for the point P of the collimated light L to be stably projected on the object O. The camera program 30 then renders pixel value of the point P as the pixel value Q of the dot for calculation of the microprocessor 13 to obtain a measurement data U of the object O. Meanwhile, an image data I can be transmitted to another device with the camera program installed therein for further measurements. In other words, the present invention enables instant measurement after taking a photo of an image and saves the image and the results for further application; it also allows photos taken in other places by other devices to be measured later by the mobile device 10 with the camera program 30 after transmission, thereby enhancing efficiency and provide conveniences for its users.

What is claimed is:

1. A mobile device with image measurement capability, comprising:
    a mobile device including a housing, a motherboard installed in the housing, a microprocessor installed on the motherboard, a memory unit installed on the motherboard and electrically connected to the microprocessor, a camera unit installed on a rear surface of the housing having a pre-determined angular field of view and being electrically connected to the microprocessor to retrieve an image with a horizontal distance of a horizontal reference line being defined across said field of view at an image plane, and a touch screen installed on a front surface of the housing and electrically connected to the microprocessor to display the image;
    a laser collimator module installed on the motherboard in the housing of the mobile device and operated by the microprocessor, the housing further having an opening hole at the rear surface thereof disposed in correspondence with said laser collimator module projecting a collimated light therethrough, the laser collimator module including a printed circuit board with a plurality of connecting elements electrically connected to the microprocessor, the laser collimator module including a laser diode disposed at a side of the printed circuit board, a driving circuit disposed between and coupled to the printed circuit board and the laser diode, a collimating lens disposed in front of the laser diode, and a case body covering the printed circuit board, the laser diode and the collimating lens and exposing the connecting elements of the printed circuit board, said case body further including a light emitting hole on a surface thereof for projection from the laser diode, the collimated light being at a pre-determined distance from an optical axis of the camera unit, the laser collimator projecting the collimated light parallel with the optical axis of the camera unit, said optical axis and collimated light respectively being perpendicular to said horizontal reference line; and
    a camera program installed in the memory unit and operated by the microprocessor to activate the camera unit, record the image and thereby retrieve an image data, said image data including pixel values for further retrieving of a set of pixel values horizontally and a pixel value of a dot within the set of pixel values; whereby the microprocessor matches the set of pixel values with the horizontal distance of the horizontal reference line and sets a point of the collimated light on the horizontal reference line as the dot in the image, establishing a reference point for measurement with the pixel value of the dot.

2. The mobile device with image measurement capability as claimed in claim 1, wherein the point of the collimated light established as the reference point is located within an angle equal to one half of the pre-determined angular field of view set for image taking of the camera program and within half of the set of the pixel values, said angle equal to one half of a pre-determined angle established as a first parameter and a distance from the reference point to the optical axis established as a second parameter so that a distance between the laser collimator module and the reference point is calculated by the first and second parameters with trigonometric functions of tangent and cotangent.

3. The mobile device with image measurement capability as claimed in claim 1, wherein the laser diode is installed on an upper surface of the printed circuit board.

4. The mobile device with image measurement capability as claimed in claim 1, wherein the light emitting hole has an L shape and has a reflector disposed at a right-angle of the L shaped light emitting hole and is inclined at 45° for reflection of light emitted from the laser diode from the laser collimator module.

5. The mobile device with image measurement capability as claimed in claim 1, wherein the camera program further has a zooming frame overlaid on the image for focusing on the point of the collimated light by finger touching on the touch screen and for setting the pixel value of the point as the pixel value of the dot, thereby a circle for recognition encircles the dot and a secondary window is displayed on the touch screen with a cross mark to display an enlarged view of the dot for further recognition of a center of the dot by finger touching thereof.

6. The mobile device with image measurement capability as claimed in claim 1, wherein the microprocessor displays a line with measurement data near the dot as the reference point on the touch screen according to the pixel value of the dot and both ends of the line are extendable by finger touching on the touch screen for further measurement.

7. The mobile device with image measurement capability as claimed in claim 1, wherein the microprocessor displays an area with measurement data near the dot as the reference point on the touch screen according to the pixel value of the dot and the area includes at least three ends that are extendable by finger touching on the touch screen for further measurement.

* * * * *